United States Patent [19]
Kuze et al.

[11] Patent Number: 5,954,107
[45] Date of Patent: *Sep. 21, 1999

[54] PNEUMATIC RADIAL TIRE

[75] Inventors: Tetsuya Kuze; Yoshimasa Hashimoto; Toshihiko Suzuki; Sadakazu Takei, all of Hiratsuka; Izumi Kuramochi; Hiroshi Tokizaki, both of Tokyo, all of Japan

[73] Assignee: The Yokohama Rubber Co., Ltd., Tokyo, Japan

[*] Notice: This patent is subject to a terminal disclaimer.

[21] Appl. No.: 08/822,610

[22] Filed: Mar. 19, 1997

[51] Int. Cl.$^6$ ............... B60C 11/03; B60C 115/00
[52] U.S. Cl. ............... 152/209.26; 152/209.28
[58] Field of Search ............... 152/209 R, 209 D, 152/209.26, 209.28, 209.18, 209.1; D12/147

[56] References Cited

U.S. PATENT DOCUMENTS

| | | | |
|---|---|---|---|
| D. 292,787 | 11/1987 | Kadomaru | D12/147 |
| D. 370,440 | 6/1996 | Kuwazima et al. | D12/147 |
| D. 376,999 | 12/1996 | Hashimoto et al. | D12/147 |
| D. 379,443 | 5/1997 | Arendt et al. | D12/147 |
| 4,986,324 | 1/1991 | Suzuki et al. | 152/209 R |
| 5,222,537 | 6/1993 | Saito et al. | 152/209 R |
| 5,291,929 | 3/1994 | Daisho et al. | 152/209 R |
| 5,337,815 | 8/1994 | Graas | 152/209 R |
| 5,353,855 | 10/1994 | Kajiwara et al. | 152/209 R |
| 5,431,208 | 7/1995 | Aoki et al. | 152/209 R |
| 5,609,699 | 3/1997 | Himuro | 152/209 R |
| 5,795,415 | 8/1998 | Campana et al. | 152/209 R |

FOREIGN PATENT DOCUMENTS

| | | | |
|---|---|---|---|
| 710577 | 5/1996 | European Pat. Off. | 152/209 R |
| 2221877 | 2/1990 | United Kingdom | 152/209 R |

*Primary Examiner*—Steven D. Maki
*Attorney, Agent, or Firm*—Finnegan, Henderson, Farabow, Garrett & Dunner, L.L.P.

[57] ABSTRACT

A pneumatic radial tire has a tread pattern having a pair of straight main grooves each having a width equal to 8–13 percent of a ground contact width W of the tire and extending in parallel on opposite sides of an equator of the tire, a plurality of lug grooves extending across shoulder regions formed on the outsides of the pair of main grooves from the pair of main grooves outwardly toward the ends of the ground contact surface of the tire to form in cooperation with the main grooves successive rows of blocks, and a plurality of V-shaped sub-grooves in the shoulder regions spaced at a predetermined pitch apart in the circumferential direction of the tire and extending divergently with respect to the direction of reverse rotation of the tire, wherein the ratio of a distance W1 between respective centers of the main grooves to the ground contact width W is in the range of $0.2 \leq W1/W \leq 0.4$; an angle $\alpha$ of inclination of the lug grooves with respect to the circumferential direction of the tire as viewed from the reverse tire rotating direction is in the range of 90°–130°; and an angle $\beta$ defined by the V-shaped sub-grooves is in the range of 15°–35°.

6 Claims, 3 Drawing Sheets

PRIOR ART

PRIOR ART

PNEUMATIC RADIAL TIRE

BACKGROUND OF THE INVENTION

1. Field of the Invention

The present invention relates to pneumatic radial tires having a directional tread pattern and more particularly to such a pneumatic radial tire suitable for all seasons.

2. Prior Art

As shown in FIG. 3, there are known pneumatic radial tires having a directional tread pattern 30 oriented with respect to the direction (R) of rotation of the tire. This tread pattern 30 comprises four straight main grooves 31 extending in the circumferential direction (T) of the tire, a straight circumferential sub-groove 32 extending over an equator (CL) of the tire, and a plurality of lateral sub-grooves 33 extending at the same angle of inclination across the main grooves 31 outwardly from the circumferential sub-groove 32 in the direction of width of the tire, whereby the main grooves 31 together with the circumferential sub-groove 32 and the lateral sub-grooves 33 form a plurality of multi-directional blocks 34 in separate relation to one another.

Recently, there has arisen a strong demand for a tire having good wet and snowy road performance for use in all seasons. Generally, for high performance under snowy conditions, tires are required to have a value of at least 100 in snow traction index (STI) represented by projected area of a pattern edge with respect to the radial direction of the tire. However, while tires having the above mentioned tread pattern of FIG. 3 excel in draining characteristics, they are not satisfactory in on-snow performance such as braking performance and turning performance because the STI value is less than 100. Hence, the tires are not applicable for use in all seasons.

SUMMARY OF THE INVENTION

It is an object of the invention to provide a pneumatic radial tire suitable for all seasons having a directional tread pattern that provides improved on-snow and wet-road performance.

According to the invention, there is provided a pneumatic radial tire having a tread pattern oriented with respect to the direction of rotation of the tire, said tread pattern comprising a pair of straight main grooves each having a width equal to 8–13 percent of a ground contact width W of the tire and extending in parallel on opposite sides of an equator of the tire to define shoulder regions, a plurality of lug grooves extending across said shoulder regions from said main grooves outwardly toward the ends of the ground contact surface of the tire and spaced at a predetermined pitch apart in the circumferential direction of the tire to form in cooperation with said main grooves successive rows of blocks, and a plurality of V-shaped sub-grooves spaced at a predetermined pitch apart in the circumferential direction of the tire and extending divergently with respect to the direction of reverse rotation of the tire to maintain said blocks in separate relation to one another, wherein the ratio of a distance W1 between the respective centers of said main grooves to said ground contact width W is in the range of $0.2 \leq W1/W \leq 0.4$; the angle $\alpha$ of inclination of said lug grooves with respect to the circumferential direction of the tire as viewed from the reverse tire rotating direction is in the range of 90°–130°; and the angle $\beta$ of diversion of said V-shaped sub-grooves is in the range of 15°–35°.

It has now been found that due to a tread pattern including a pair of main grooves characterized by the width in the above-mentioned range and the ratio of a distance W1 between the respective centers of the main grooves to the ground contact width W in the above-mentioned range and provided on opposite sides of an equator of the tread, the main grooves are wider and have enhanced draining capability in comparison with those of the conventional tread pattern because they are disposed intensively in the central regions of the tread which is most effective in draining characteristics.

Consequently, the inventive pneumatic radial tire is synergistically improved and superior in wet-road performance to those having the conventional tread pattern.

A plurality of lug grooves extending over both shoulder regions so as to form a V-shape diverging with respect to the direction of rotation of a tire facilitates channeling of snow sidewards of the tire, thereby ensuring that the tire has excellent drivability, whereas lug grooves extending divergently with respect to the direction of reverse rotation of the tire leads to a tire having improved braking performance.

The tire according to the invention has good driving performance under snowy conditions due to the presence of the lug grooves extending at an angle $\alpha$ of inclination in the above-specified range so as to be at right angles with respect to the direction of rotation of the tire or formed in V-shape diverging with respect to the same.

Furthermore, the V-shaped sub-grooves extending divergently at a sharp angle $\beta$ in the above range to maintain the blocks in separate relation to one another provide the tire with increased edging effect against lateral force, leading to enhanced gripping force thereby ensuring that the tire retains turning performance on a roadway covered with snow.

In addition to the edging effect by the sub-grooves, edging effect with respect to the circumferential direction of the tire is increased by the lug grooves and thus is conducive to high braking performance under snowy conditions.

DETAILED DESCRIPTION OF THE INVENTION

Figure 1:
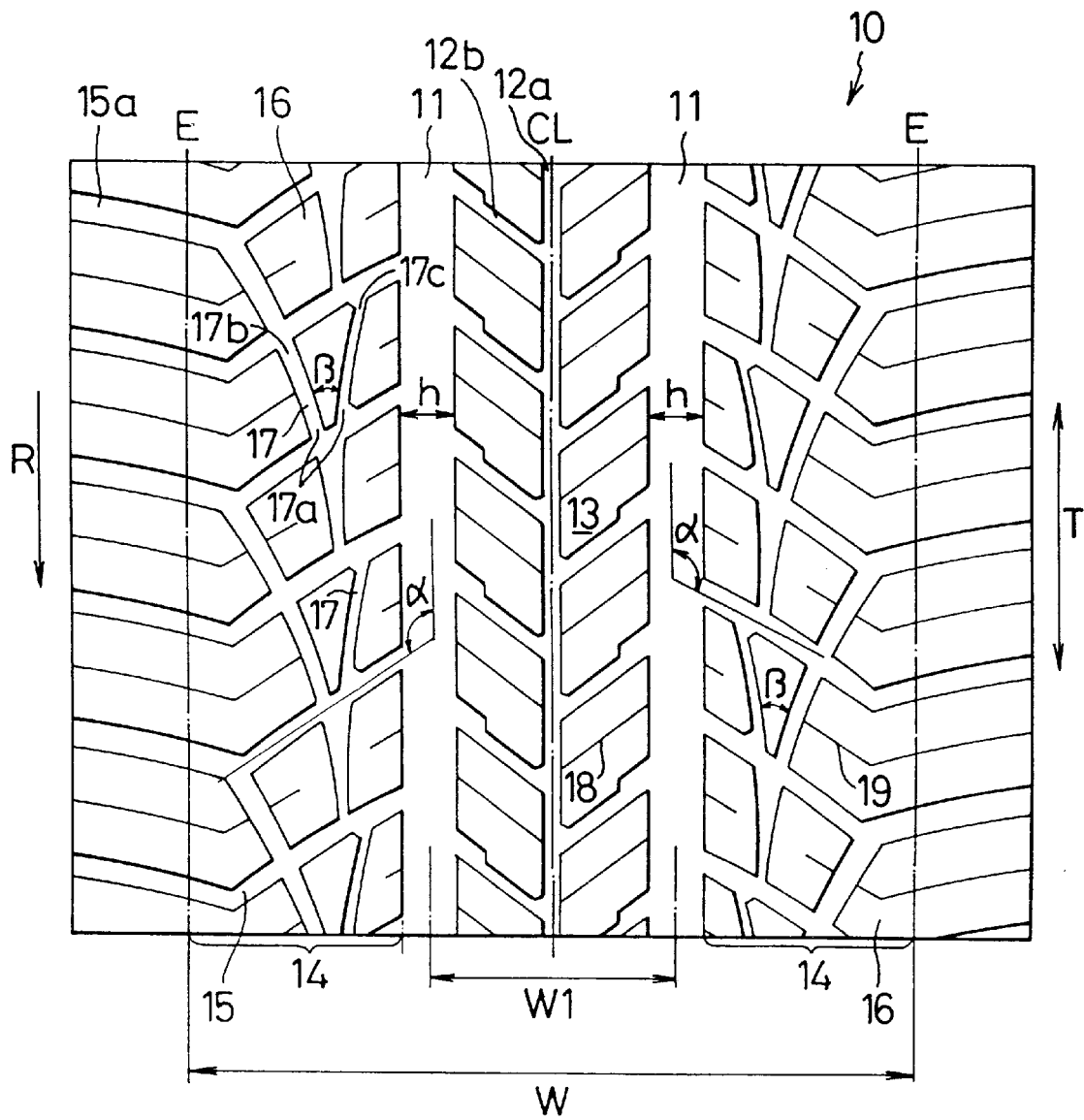
FIG. 1 is a plan view of a tread pattern provided on the pneumatic radial tire according to the present invention.

Referring now to the drawings, and particularly to FIG. 1, there is shown a tread pattern of a pneumatic radial tire according to the invention. In FIG. 1, the direction of rotation of the tire is indicated by an arrow R. A tread surface 10 is provided with a pair of straight main grooves 11 extending in parallel on opposite sides of an equator (CL) of the tire. There is provided a circumferential sub-groove 12a between the main grooves on the equator. A plurality of lateral sub-grooves 12b extend from the circumferential sub-grooves 12a in communication with the main grooves 11 obliquely at an angle with respect to the direction of reverse rotation of the tire, thereby defining a plurality of blocks 13. The lateral sub-grooves 12b on opposite sides of the equator (CL) are located out of alignment with one another and hence alternately merge with the circumferential sub-groove 12a. Shoulder regions 14 defined by the main grooves 11 and an end (E) of a ground contact surface width W are provided with a plurality of lug grooves 15 extending from the main grooves 11 across toward the ends (E) of the ground contact surface of the tire and spaced a predetermined pitch apart in the circumferential direction (T) of the tire. The lug grooves 15 extend beyond the ground contact surface ends (E), the portions 15a of the lug grooves 15 in the vicinity of the ends (E) being inclined with respect to the direction of reverse rotation of the tire. The shoulder regions 14 are provided with successive rows of blocks 16 defined by the main grooves 11 and the lug grooves 15.

The blocks 16 in the shoulder regions 14 are provided with a plurality of V-shaped sub-grooves 17 that maintain the blocks 16 in separate relation to one another. The V-shaped sub-grooves 17 extend divergently with respect to the direction of reverse rotation of the tire and are spaced a predetermined pitch apart in the circumferential direction (T) of the tire. Each of the V-shaped sub-grooves 17 intersects with the lug grooves 15 and is disposed astride a plurality of the blocks 16 positioned in back and forth relation with respect to the circumferential direction (T) of the tire. The top or pointed end 17a and diverging ends 17b, 17c of the V-shaped sub-grooves are in communication with the lug grooves 15, the diverging ends 17b extending toward the ground contact surface ends (E) and being connected with the portions 15a of the lug grooves 15.

The numerals 18, 19 designate sipes provided on each of the blocks 13, 16. The sipes 18 extend in parallel to the lateral sub-grooves 12b toward the ground contact surface ends, both ends of the sipes being communication with the main groove 11 and the circumferential sub-groove 12a.

Each of the main grooves 11 has a width equal to 8–13 percent of the ground contact surface width (W). In the tread pattern of the inventive tire, there are provided only two main grooves. The ratio of a distance W1 between respective centers of the main grooves 11 to the ground contact width (W) is set in the range of $0.2 \leq W1/W \leq 0.4$.

The angle $\alpha$ of inclination of the lug grooves 15 with respect to the circumferential direction (T) of the tire as viewed from the direction of reverse tire rotation is in the range of from 90° to 130°, while the angle $\beta$ of diversion of the sub-grooves 17 is in the range of from 15° to 35°

If the main grooves 11 width (h) is less than 8 percent of the ground contact width (W), the grooves would fail to ensure sufficient draining characteristics for the tire and if the width (h) is greater than 13 percent, it would lead to reduced steering stability due to decreased ground contact area.

Ratios W1/W of less than 0.2 or in excess of 0.4 would result in reduced draining capabilities of the central region of the tread.

If the inclination angle $\alpha$ of the lug grooves 15 is less than 90°, the tire would fail in on-snow driving performance and if it is greater than 130°, it would result in the formation of too small a block, leading to reduced steering stability.

If the diversion angle $\beta$ of the sub-grooves 17 is less than 15°, it would lead to poor braking performance due to reduced edging effect with respect to the circumferential direction of the tire and if it is in excess of 35°, the tire would fail in on-snow turning performance and draining characteristics.

As shown in FIG. 1, the main grooves 11 each are located preferably symmetrically on opposite sides of the equator (CL) of the tire. The width of each of the main grooves 11 may be the same as shown in FIG. 1 but may be different.

Figure 2:
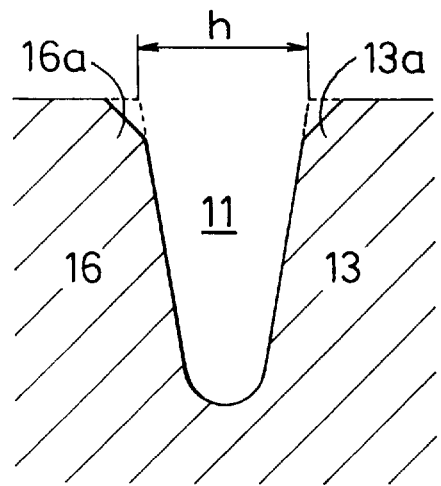
FIG. 2 is a sectional view of a main groove having tapered edges.

There may be provided between the main grooves 11 a land comprising a plurality of ribs instead of the blocks 13 shown in FIG. 1. As shown in FIG. 2, the main grooves 11 are preferably flat chamfered at edge portions thereof where they contact the edges 13a, 16a of the blocks 13, 16, in which instance, the width (h) of the chamfered groove 11 is defined by a distance between two imaginary points of intersection of the extensions of the groove walls and the tread surfaces.

The inclination and diversion angles $\alpha$ and $\beta$ of the lug grooves 15 and the sub-grooves 17 may be measured therealong if these grooves are straight. If these grooves are arcuate in shape, the inclination angle $\alpha$ is determined by the angle between the main groove and a tangent line of the lug groove at the middle point between the main groove and the ground contact end and the diversion angle $\beta$ of the sub-groove is determined by the angle between the two tangent lines at the intersect of the arc of the sub-groove.

The term "ground contact width" referred to herein designates a width of a tread surface when held in contact with a ground surface under 80% of a standard design load at a standard air pressure in accordance with JATMA.

The invention will be further described by way of the following examples.

Experimental tests under a variety of conditions were conducted with various sample tires of 205/60R15 having the directional tread pattern in FIG. 1 varied in pattern characteristics.

Figure 3:
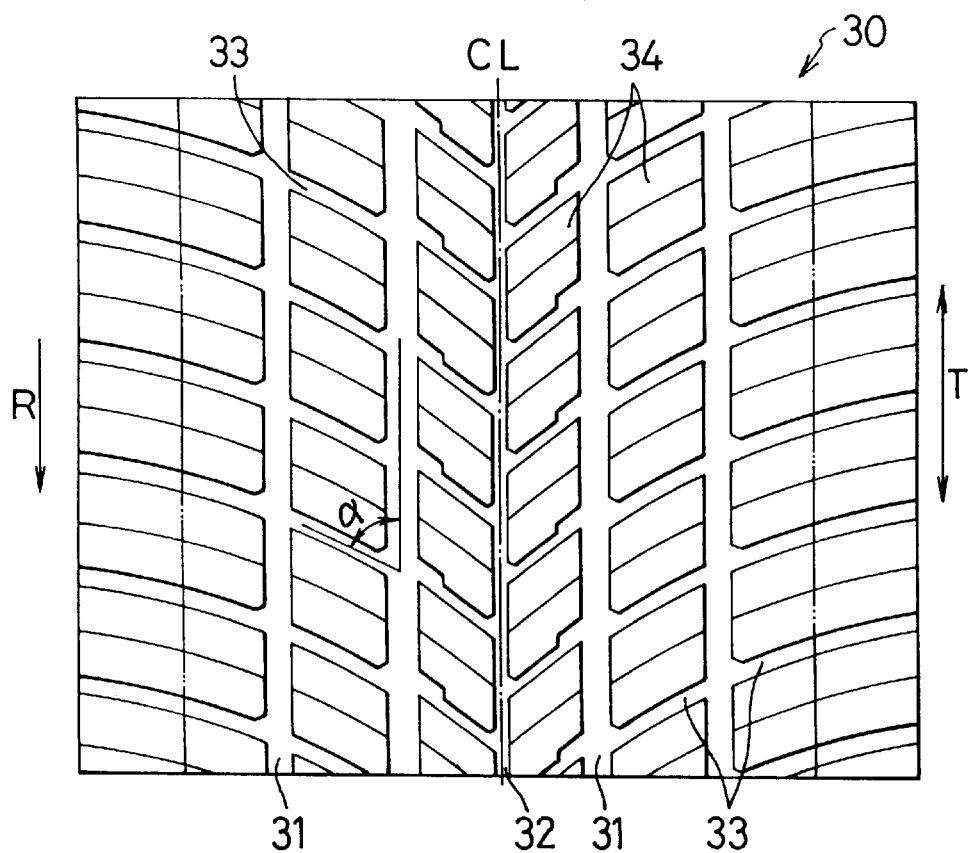
FIG. 3 is a plan view of a tread pattern of a conventional tire.

Inventive Examples 4–6 and Comparative Examples 3 and 4 were varied in the ratio of W1/W. Inventive Examples 6–9 and Comparative Examples 5 and 6 are varied in the inclination angle $\alpha$ of the lug groove 15. Inventive Examples 10 and 12 and Comparative Examples 7 and 8 are varied in the diversion angle $\beta$ of the sub-groove 17. A commercially available tire of the same size having a tread pattern shown in FIG. 3 was also used as a control tire. The tire of FIG. 4 has a tread pattern in which the same lateral sub-grooves 33 are inclined in opposite direction from those shown in FIG. 3.

Each of the sample tires has a width of 158 mm. The tread surfaces of the tires of Inventive Examples 1–12 and Comparative Examples 1–8 have in common the following pattern characteristics except for the above variations.
Tread pattern characteristics
  Main groove width h:16 (0.10W) mm
  W1/W:0.3
  Inclination angle $\alpha$:110°
  Diversion angle $\beta$:25°

Figure 4:
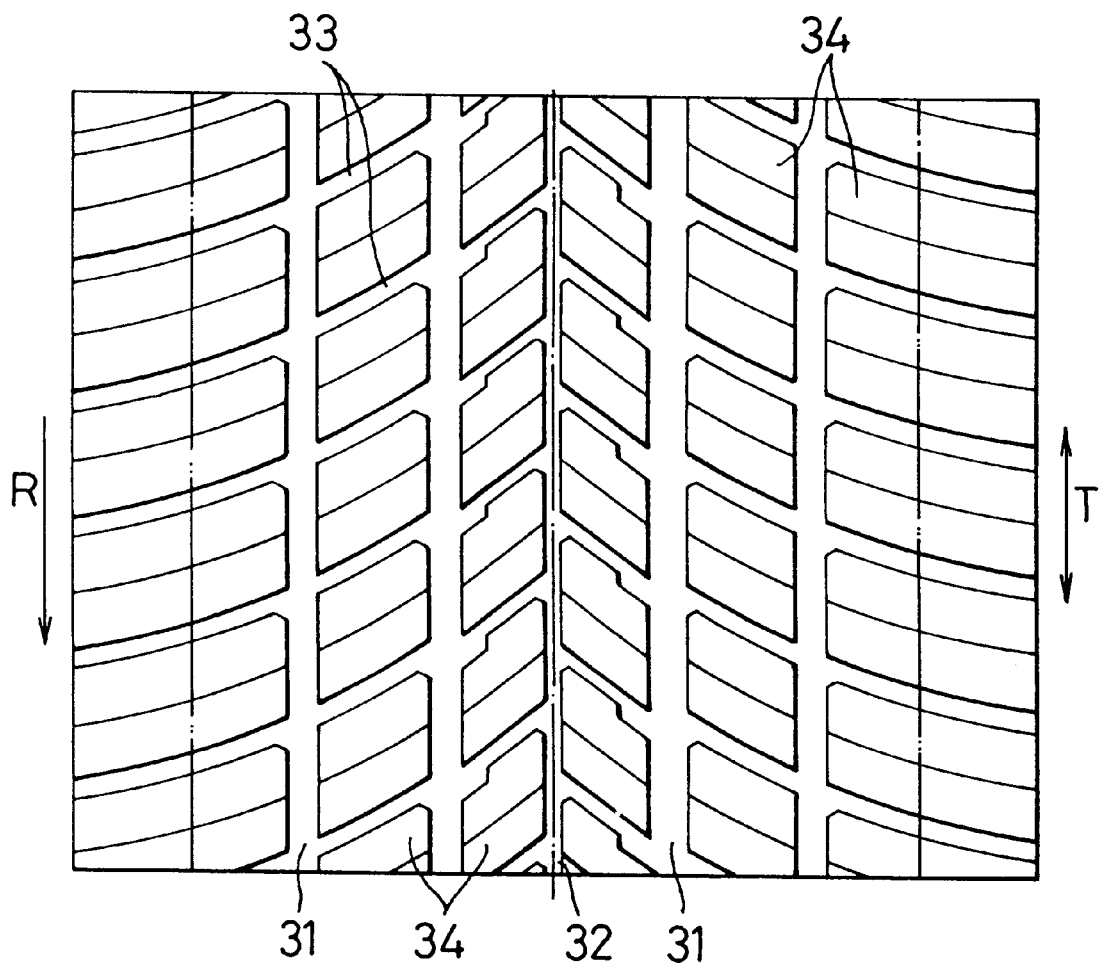
FIG. 4 is a plan view of the tread pattern of another conventional tire.

The tires of Control and FIG. 4 have a tread pattern in which the widths of inner main grooves and outer main grooves are 8 mm and 7 mm respectively and the inclination angles a of sub-grooves 33 are 65° and 115° respectively.

Each of the sample tires mounted on a 15×61/2 JJ rim was mounted on a passenger car of 2500 cc displacement and inflated to air pressure of 200 kPa for the performance tests conducted under the following conditions with the results shown in Tables 1 through 4.
Wet-road performance
  The test car was driven acceleratively on road covered with water of 2 mm in average depth. Wet-road performance was evaluated by a critical speed at which hydroplaning occurred. Comparison was made by taking the result of Control tire as a reference index of 100, the larger the index value, the better wet-road performance.
Steering stability (on dry road)
  A test driver assessed the steering quality of the test car mounted with each set of sample tires. A reference value of 100 for Control tire was taken as an index. Steering stability is better the larger the index value.

On-snow driving performance

Climbing test was conducted on snowy sloped road at a snow temperature between −3° C. and −6° C. and an ambient temperature between −2° C. and −5° C. The car was fully accelerated from initial speed of 20 km/h. Driving performance was evaluated by the time consumed in traveling over a predetermined distance. Test results were indicated by inverse number. A reference value of 100 for conventional tire (Control) was taken as an index. Driving performance is better the larger the index value.

On-snow braking performance

A braking distance was measured at a temperature of ranging from −3° C. to −6° C. after the car was started at 40 km/h on a test road covered with snow of temperature between −2° C. and −5° C. A reference value of 100 for conventional tire (Control) was used as an index. Braking performance is better the larger the index value.

On-snow turning performance

The car was turned in a circle of a radius of 30 mm on test road covered with snow of between −3° C. and −6° C. and at an ambient temperature of −2° C. and −5° C. Turning performance was evaluated by the length of time taken over a predetermined distance. A reference value of 100 for conventional tire (Control) was taken as an index. Turning performance is better the larger the index value.

As demonstrated by the tabulated results, Inventive tires have been found satisfactory in respect of all the performance tests and thus applicable for all seasons. The tire of Inventive Example 1 was 130 in STI value.

TABLE 1

|  | Comparative Example 1 | Inventive Examples | | | Comparative Example 2 | Control | Comparative Example 3 |
|---|---|---|---|---|---|---|---|
|  |  | 1 | 2 | 3 |  |  |  |
| main groove width h | 0.06 W | 0.08 W | 0.10 W | 0.13 W | 0.15 W | — | — |
| wet-road performance | 98 | 105 | 110 | 114 | 120 | 100 | 92 |
| steering stability | 105 | 103 | 100 | 100 | 95 | 100 | 100 |
| on-snow driving performance | 104 | 102 | 105 | 100 | 97 | 100 | 92 |
| on-snow braking performance | 108 | 106 | 105 | 102 | 97 | 100 | 108 |
| on-snow turning performance | 97 | 100 | 103 | 105 | 106 | 100 | 102 |

TABLE 2

|  | Comparative Example 3 | Inventive Examples | | | Comparative Example 4 |
|---|---|---|---|---|---|
|  |  | 4 | 5 | 6 |  |
| W1/W | 0.1 | 0.2 | 0.3 | 0.4 | 0.5 |
| wet-road performance | 97 | 104 | 110 | 106 | 98 |
| steering stability | 100 | 100 | 100 | 100 | 98 |
| on-snow driving performance | 105 | 105 | 105 | 105 | 105 |
| on-snow braking performance | 105 | 105 | 105 | 105 | 105 |
| on-snow turning performance | 97 | 101 | 103 | 106 | 107 |

TABLE 3

|  | Comparative Example 5 | Inventive Examples | | | Comparative Example 6 |
|---|---|---|---|---|---|
|  |  | 7 | 8 | 9 |  |
| inclination angle α (°) | 70 | 90 | 110 | 130 | 150 |
| wet-road performance | 118 | 115 | 110 | 105 | 98 |
| steering stability | 100 | 100 | 100 | 100 | 96 |
| on-snow driving performance | 98 | 110 | 105 | 102 | 97 |
| on-snow braking performance | 96 | 102 | 105 | 109 | 101 |
| on-snow turning performance | 97 | 100 | 103 | 106 | 108 |

TABLE 4

|  | Comparative Example 7 | Inventive Examples | | | Comparative Example 8 |
|---|---|---|---|---|---|
|  |  | 10 | 11 | 12 |  |
| diversion angle β (°) | 10 | 15 | 25 | 35 | 45 |
| wet-road performance | 118 | 115 | 110 | 104 | 97 |
| steering stability | 98 | 100 | 100 | 100 | 97 |

TABLE 4-continued

|  | Comparative Example 7 | Inventive Examples | | | Comparative Example 8 |
|---|---|---|---|---|---|
|  |  | 10 | 11 | 12 |  |
| on-snow driving performance | 95 | 99 | 105 | 108 | 111 |
| on-snow braking performance | 109 | 107 | 105 | 103 | 98 |
| on-snow turning performance | 108 | 106 | 103 | 100 | 95 |

What is claimed is:

1. A pneumatic radial tire having a tread pattern oriented with respect to the direction of rotation of the tire, said tread pattern comprising a pair of straight main grooves each having a width equal to from 8 to 13 percent of a ground contact surface width W of the tire and extending in parallel on opposite sides of an equator of the tire, each main groove defining between it and a side end of the ground contact surface width W of the tire a shoulder region, a plurality of lug grooves extending across said shoulder regions from said main grooves outwardly toward the side ends of the ground contact surface width W of the tire and spaced apart at a predetermined pitch in the circumferential direction of the tire, and a plurality of V-shaped sub-grooves in said shoulder regions spaced at a predetermined pitch apart in the circumferential direction of the tire and extending divergently in the direction of reverse rotation of the tire to form in cooperation with said main grooves and said lug grooves successive rows of blocks, each row extending from the main groove outwardly toward a side end of the ground contact surface width W of the tire and containing a plurality of blocks, wherein the ratio of a distance $W1$ between respective centers of said main grooves to said ground contact surface width W is in the range of $0.2 \leq W1/W \leq 0.4$; an angle $\alpha$ of inclination of said lug grooves with respect to the circumferential direction of the tire as viewed from the reverse tire rotating direction is in the range of from $90°-130°$; and an angle $\beta$ defined by said V-shaped sub-grooves is in the range of from $15°-35°$.

2. The tire of claim 1, wherein said tread pattern includes a plurality of lateral sub-grooves extending between said pair of main grooves and in communication therewith to form in cooperation with said main grooves a plurality of blocks.

3. The tire of claim 2, including a circumferential sub-groove positioned over the equator of the tire, wherein said plurality of lateral sub-grooves extend between and in communication with said main grooves and said circumferential sub-groove.

4. The tire of any one of claims 1, 2, or 3, wherein each of said V-shaped sub-grooves extend astride a plurality of said blocks in the shoulder regions of the tire in the circumferential direction of the tire.

5. The tire of any one of claims 1, 2, or 3, wherein said lug grooves have a first portion that extends across said shoulder region from said main grooves toward said side ends of the ground contact surface width W and a second portion that extends beyond the side ends of the ground contact surface width W.

6. The tire of claim 5, wherein said first and second portions of said lug grooves are inclined with respect to each other in the vicinity of the ends of the ground contact surface width W of the tire.

* * * * *